July 15, 1958 A. A. BONDE ET AL 2,843,159
SPRING FORMING APPARATUS
Filed Jan. 11, 1956 9 Sheets-Sheet 4
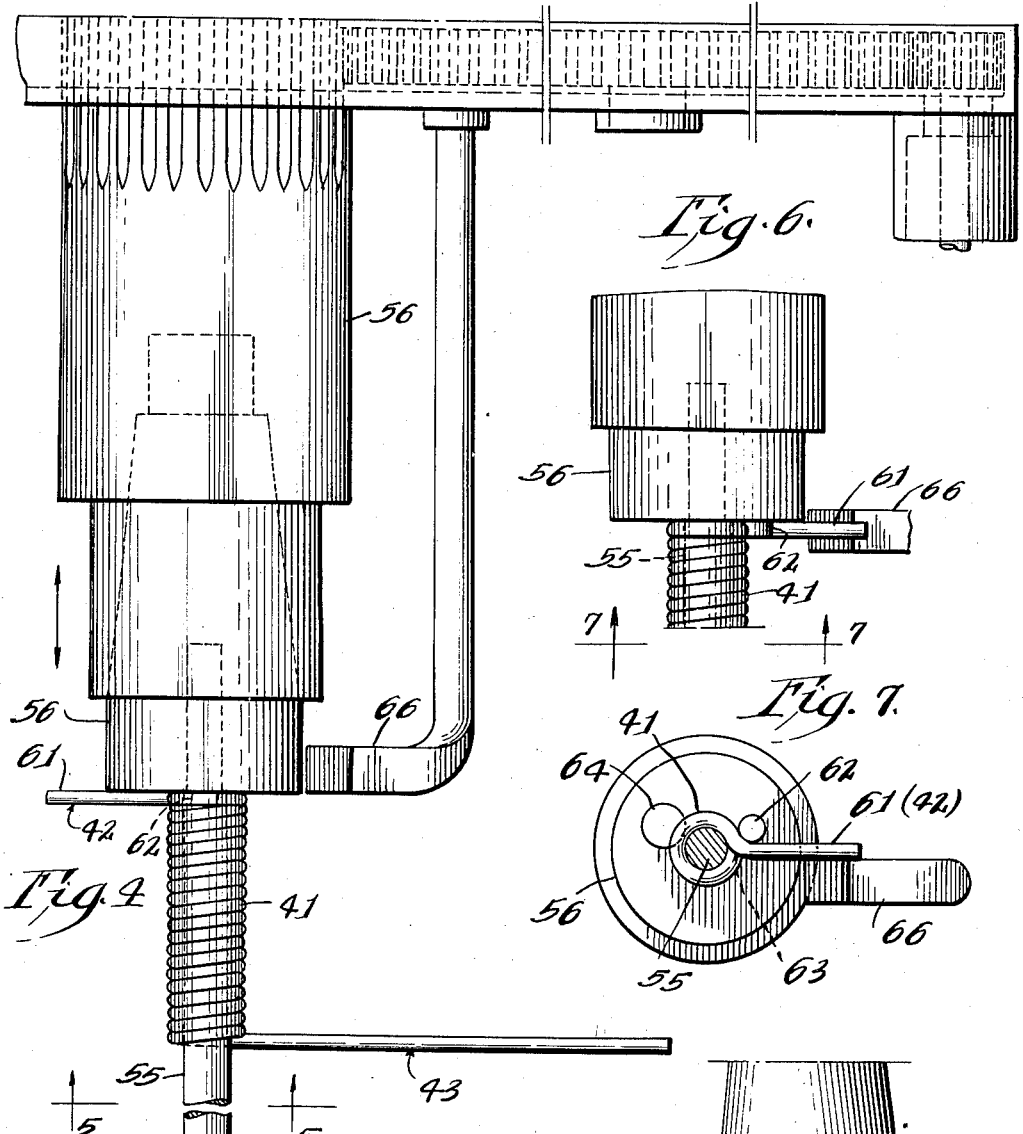
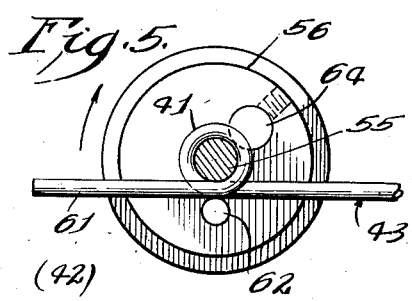
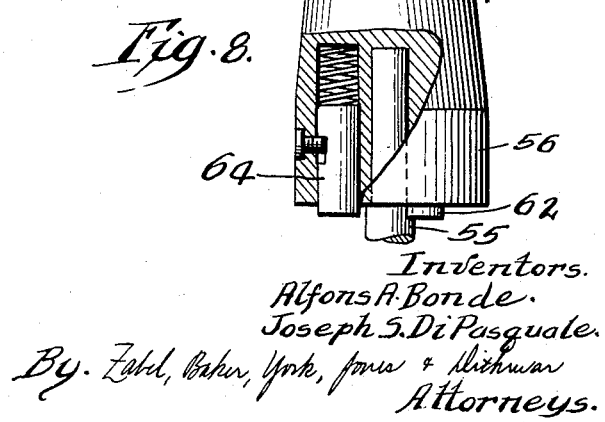
Inventors.
Alfons A. Bonde.
Joseph S. DiPasquale.
By Zabel, Baker, York, Jones & Hichman
Attorneys.

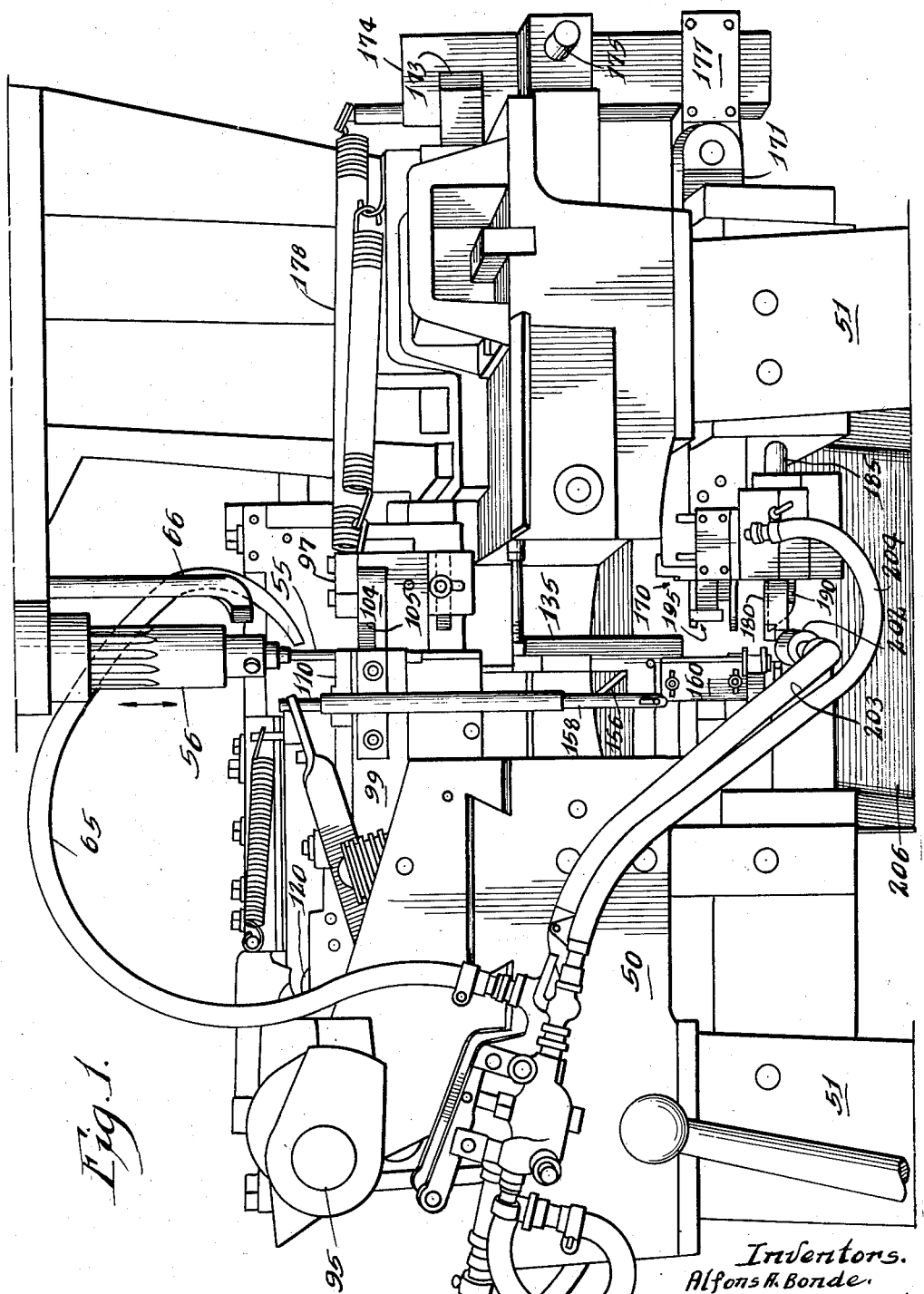

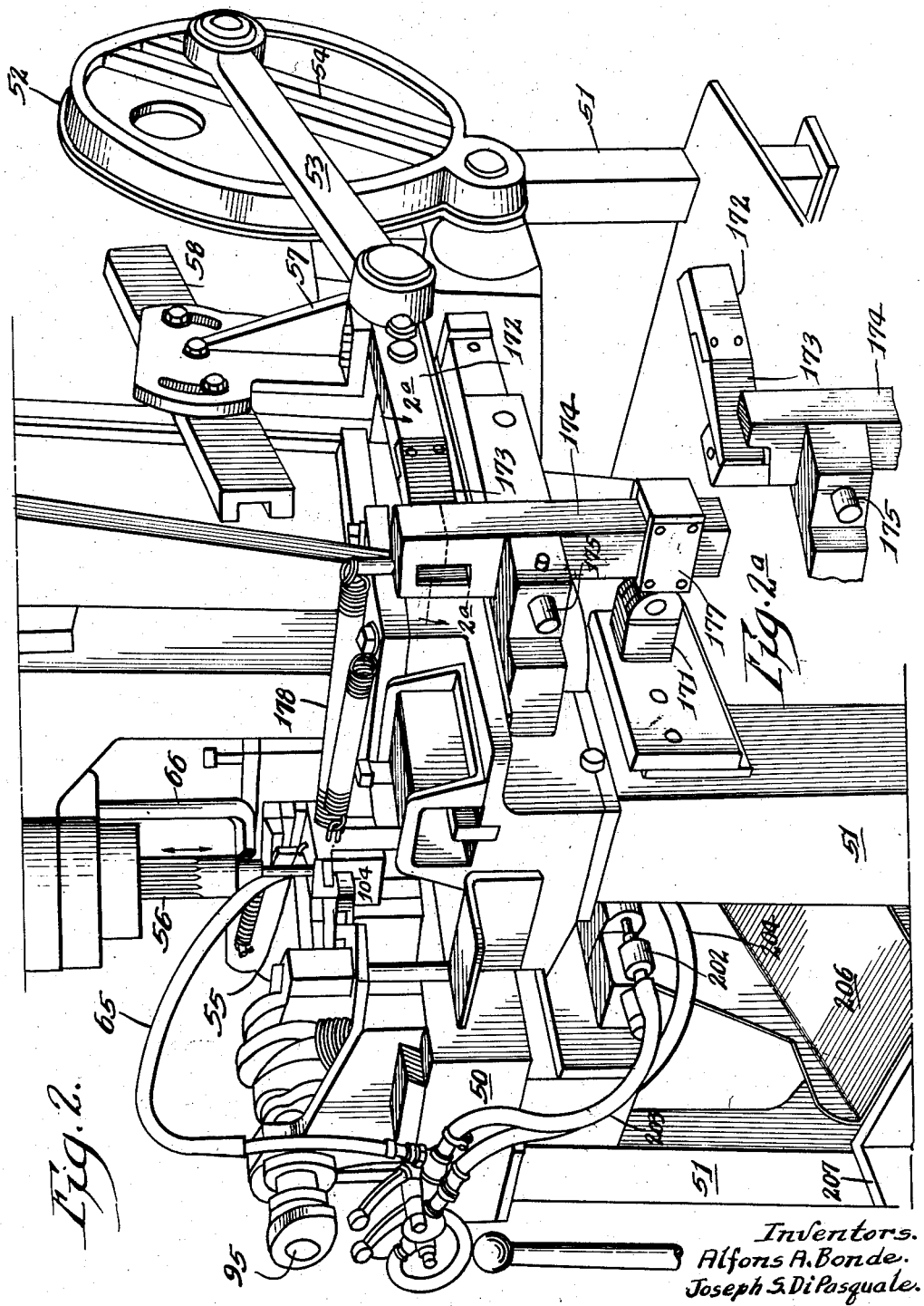

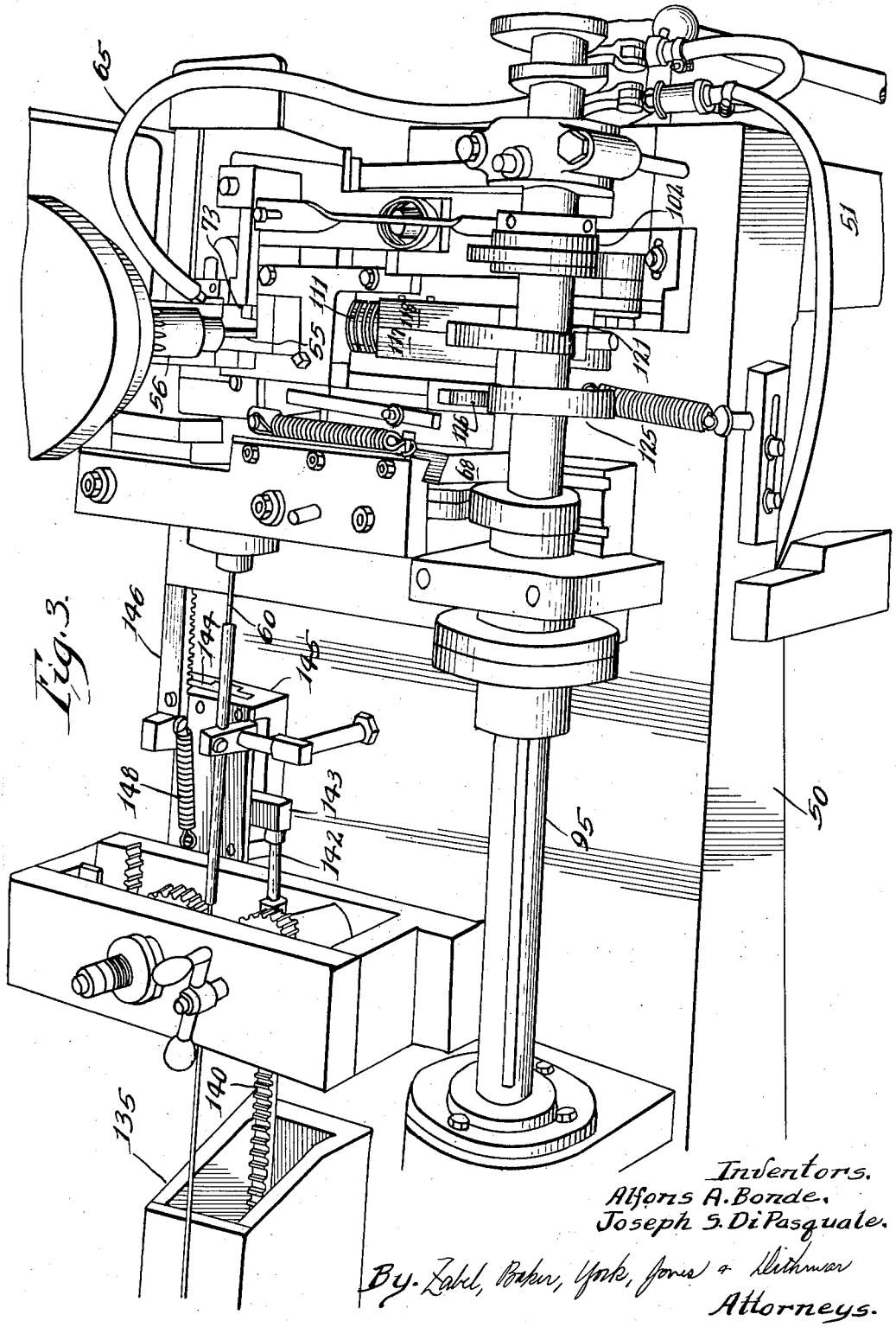

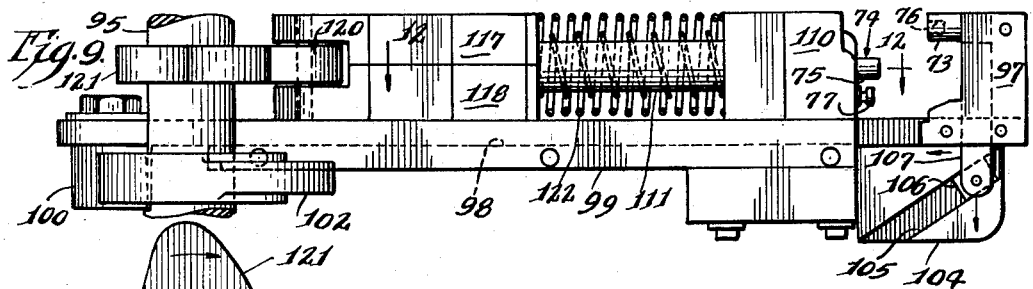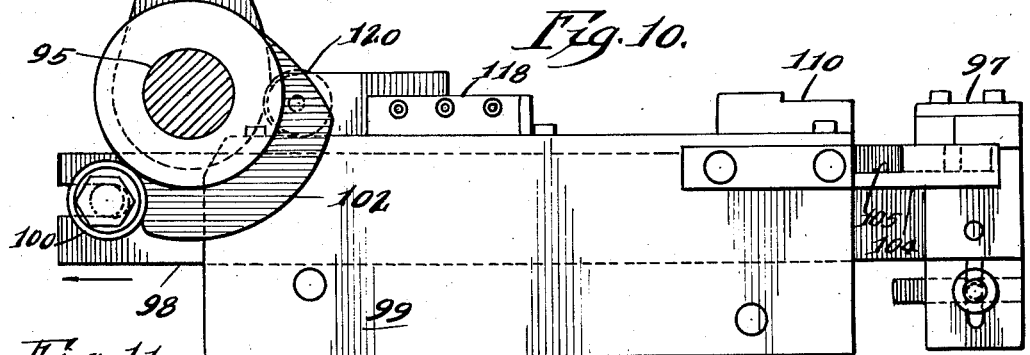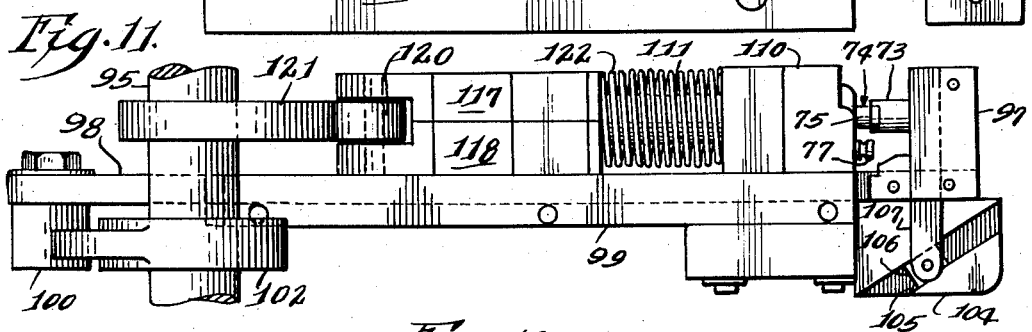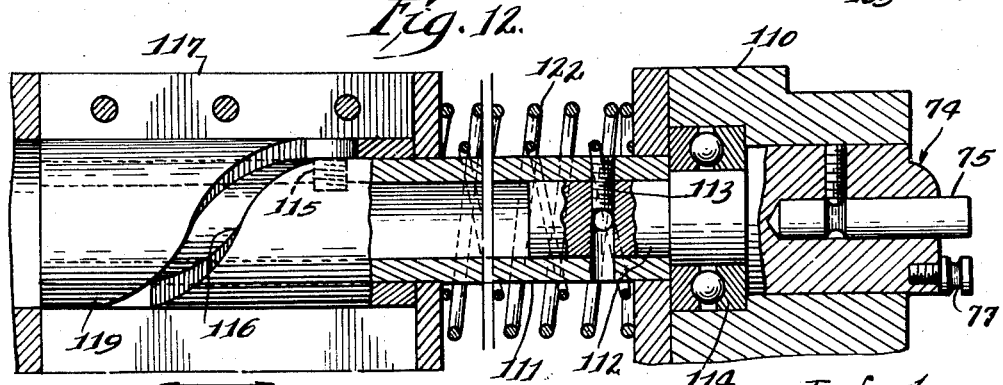

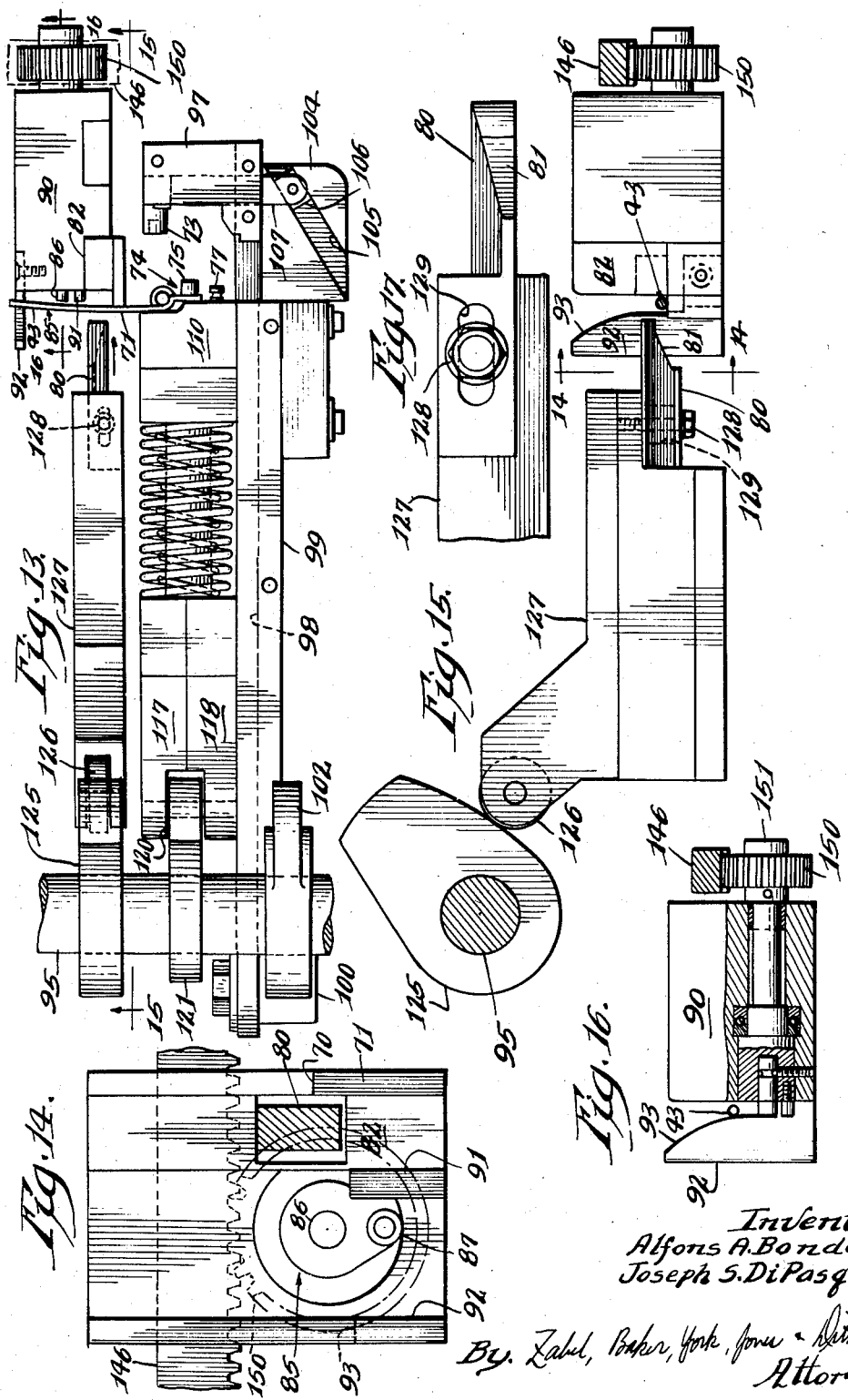

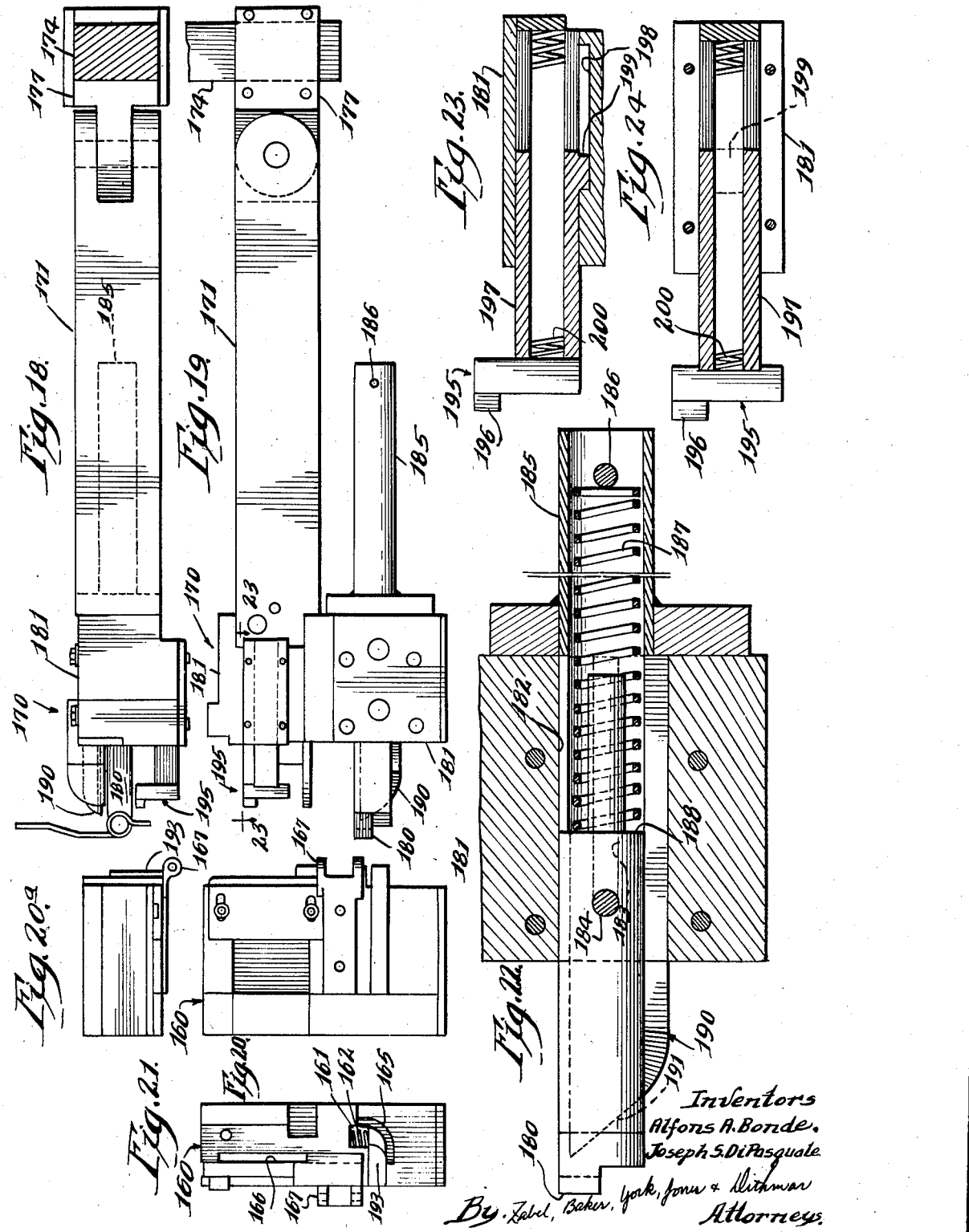

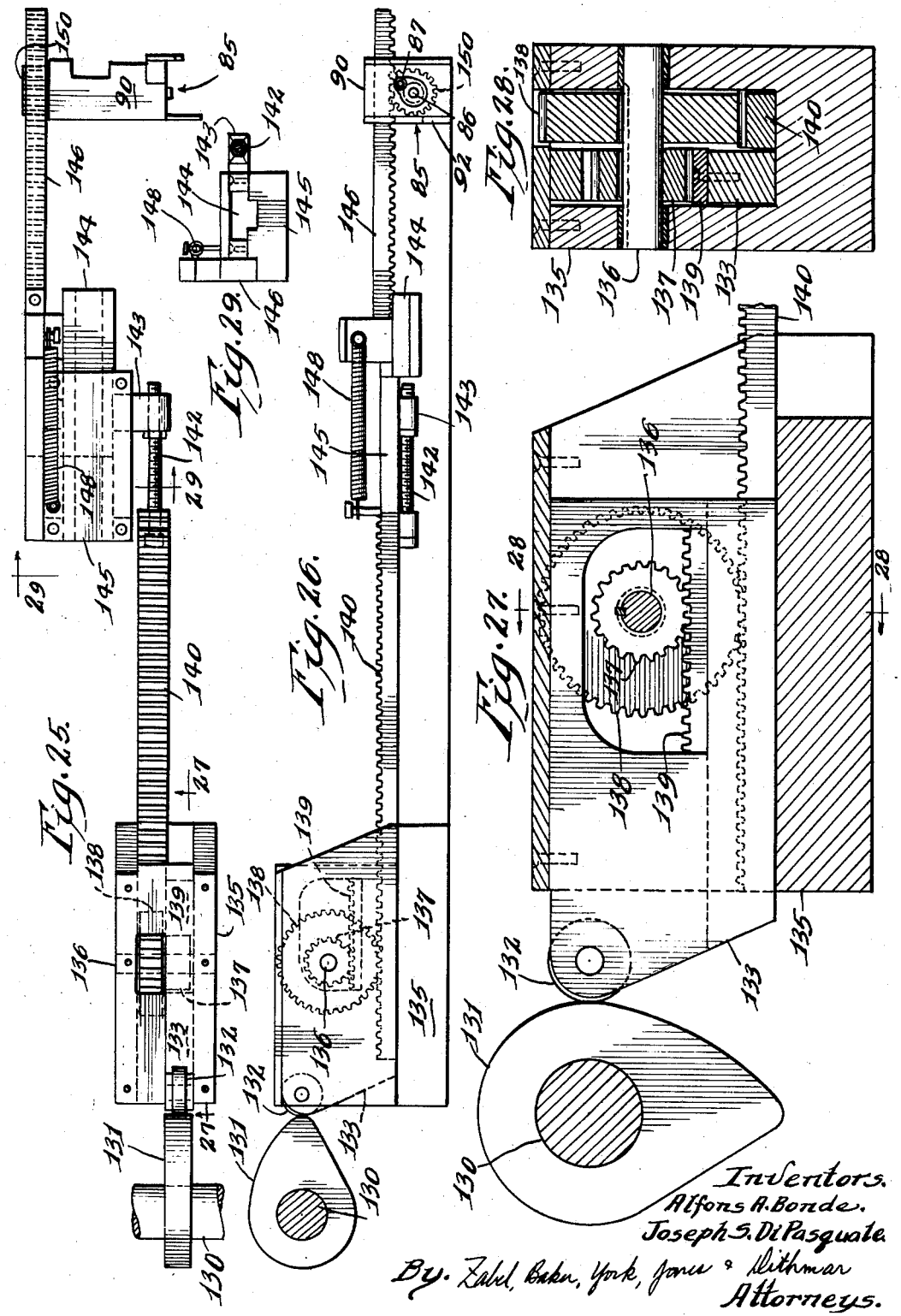

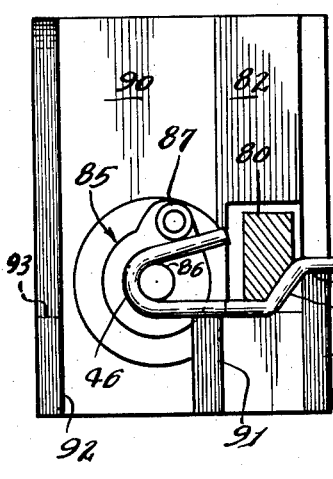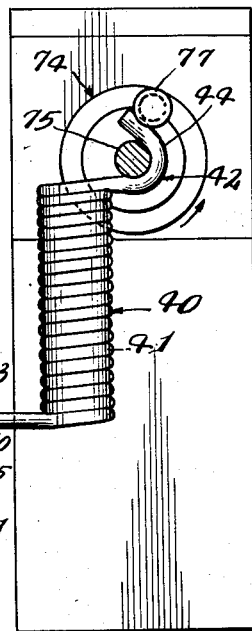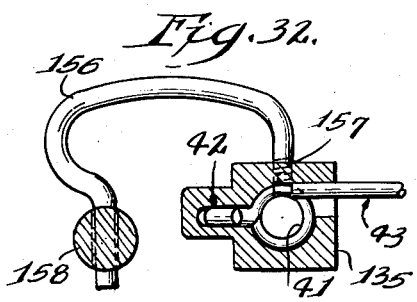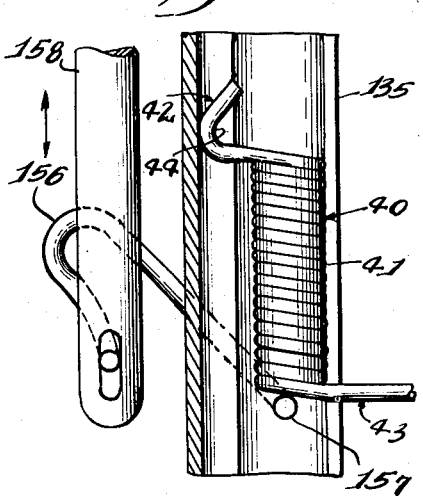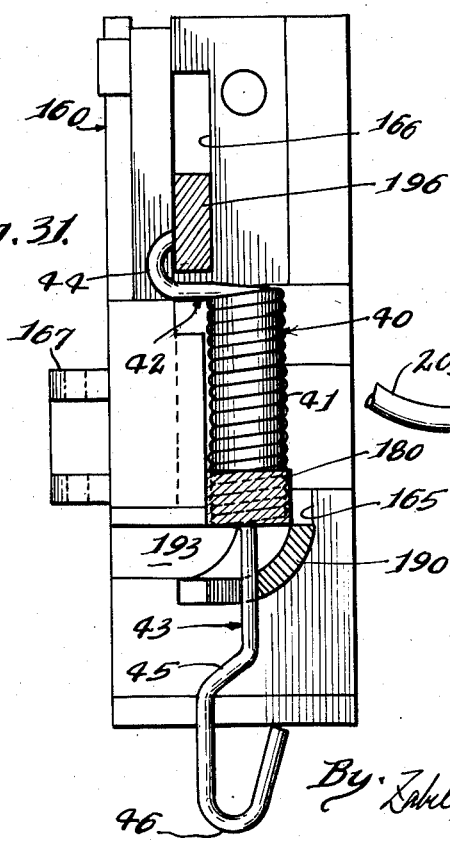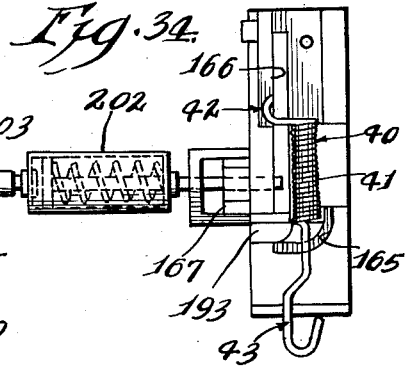
Inventors.
Alfons A. Bonde.
Joseph S. DiPasquale.

United States Patent Office 2,843,159
Patented July 15, 1958

2,843,159

SPRING FORMING APPARATUS

Alfons A. Bonde, Oak Park, and Joseph S. Di Pasquale, Elmwood Park, Ill.

Application January 11, 1956, Serial No. 558,455

9 Claims. (Cl. 140—71)

This invention relates to spring forming apparatus, and more particularly to apparatus for fabricating springs for specialized uses. Springs formed by this apparatus are characterized by the provision of end or leg portions having predetermined configurations.

One object of the invention is to provide spring forming apparatus which is capable of fabricating specialized springs of extreme uniformity.

Another object of the invention is to provide apparatus which is fully automatic in operation.

Still another object is to provide apparatus capable of fabricating springs in such a manner as to effect substantial saving in labor and machines by comparison with prior methods and apparatus for fabricating such springs. In particular, the present apparatus when operated at maximum capacity eliminates at least three separate punch presses and individual operators therefor which heretofore have been required for fabricating the same quantity of springs.

The labor and apparatus economies provided by the present apparatus permits a user of the apparatus in 1955 to sell springs of the type made by apparatus for no more than the price charged for the same springs in 1940. In other words, the improved apparatus is such that it may completely eliminate the inflation in material, machine and labor costs of the past fifteen years.

The present apparatus employs a more or less conventional torsion coiler for forming the basic spring. This machine is well known in the art and accordingly the following detailed description will be rather general as far as the torsion coiler itself is concerned. As will be seen, a conventional torsion coiler has been modified in various respects to accommodate auxiliary forming apparatus which cooperates with the coiler to constitute the apparatus of the invention.

The present spring forming apparatus is a unitary machine which when properly adjusted operates automatically and continuously. Spring wire is fed into the machine and a succession of finished springs is ejected from the apparatus into storage bins or shipping containers. The apparatus is capable of continuous operation throughout a work day with no more than occasional inspection.

Briefly described, the present spring forming apparatus comprises three simultaneously operating stages which may derive power for operation from a common power source.

Stage I essentially consists of a conventional torsion coiler which coils a spring of predetermined diameter and length with long and short leg portions extending generally at right angles to the spring body. This first stage also includes means for cutting the formed spring from the wire stock of which the spring is made.

Stage II comprises means which perform certain forming operations on both leg portions of the spring.

Stage III comprises certain other means which perform further forming operations on one of the leg portions and which cuts the other leg portion to precise, predetermined length.

The apparatus includes means automatically transporting the springs from one stage to the next, and means ejecting the finished springs from the last stage. One cycle of apparatus operation effects one cycle of operation in each stage, so that the apparatus after the first two cycles of operation has three springs in course of production and completes and ejects one spring following each cycle of apparatus operation.

The apparatus here illustrated and described is capable of producing springs of various shapes and sizes inasmuch as the forming components are subject to adjustment or obvious modification. The particular spring illustrated as being formed by the apparatus is a spring which is used extensively in the brake systems of motor vehicles. This spring, which has specially shaped leg portions, is exemplary of springs which may be produced by subject apparatus.

Other objects, advantages and details of the invention will be apparent as the description proceeds, reference being had to the accompanying drawings wherein one form of the invention is shown. It is to be understood that the description and drawings are illustrative only and the scope of the invention is to be measured by the appended claims.

In the drawings:

Fig. 1 is a general view in front elevation of spring forming apparatus embodying the invention;

Fig. 2 is a general perspective view of the apparatus shown in Fig. 1;

Fig. 2a is a fragmentary sectional view on line 2a—2a of Fig. 2;

Fig. 3 is a general perspective view looking down on the apparatus from the left side (referring to Fig. 1);

Fig. 4 is an enlarged elevational view of the spring-coiling mandrel and chuck, the mandrel containing a partially formed spring of the type produced by this apparatus;

Fig. 5 is a sectional view on line 5—5 of Fig. 4;

Fig. 6 is a fragmentary elevational view of the spring-coiling mandrel and chuck showing the engagement of the upper or short leg portion of the spring with a stop which cooperates to form a bend in that leg portion;

Fig. 7 is a sectional view on line 7—7 of Fig. 6;

Fig. 8 is an elevational view, partly in section, of the head of the spring-coiling mandrel showing one form of spring ejector;

Fig. 9 is a plan view of that part of the apparatus which bends a hook in the upper or short leg portion of the spring, the part being shown in open condition;

Fig. 10 is an elevational view of the apparatus part shown in Fig. 9;

Fig. 11 is a plan view like Fig. 9 except that the part is shown in closed condition;

Fig. 12 is an enlarged, fragmentary sectional view generally on the line 12—12 of Fig. 9, the rotatable member at the right end being oriented the same as in Fig. 9 for clarity;

Fig. 13 is a plan view of the apparatus part shown in Fig. 9 with the addition of the part of the apparatus which bends an offset and a hook in the lower or long leg portion of the spring;

Fig. 14 is an end elevational view of the apparatus part which bends the hook in the lower or long leg portion of the spring, the view being taken on line 14—14 of Fig. 15;

Fig. 15 is a side elevational view of the apparatus part which bends the offset and hook in the lower or long leg portion of the spring, the view being taken on line 15—15 of Fig. 13;

Fig. 16 is a sectional view taken on line 16—16 of Fig. 13;

Fig. 17 is an enlarged bottom view of the die element which bends the offset in the lower or long leg portion of the spring.

Fig. 18 is a plan view of the male apparatus part which cuts off the hooked upper or short leg portion to proper length and bends the lower or long leg portion into proper angular relation with the spring axis;

Fig. 19 is a side elevational view of the male apparatus part shown in Fig. 18;

Fig. 20 is a side elevational view of the female apparatus part which cooperates with the male apparatus part of Figs. 18 and 19;

Fig. 20a is a plan view of the female apparatus part shown in Fig. 20;

Fig. 21 is a right hand end elevational view of the female apparatus part which mates with the male apparatus part shown in Figs. 18 and 19 and cooperates to cut off the end of the upper or short leg portion and to bend the lower or long leg portion of the spring;

Fig. 22 is an enlarged fragmentary view, partly in section of the holder and die elements which cooperate to bend the lower or long leg portion of the spring;

Fig. 23 is an enlarged sectional view of the cutter element, the view being taken in line 23—23 of Fig. 19;

Fig. 24 is an elevational view, partly in section, of the cutter element shown in Fig. 23;

Fig. 25 is a plan view showing the structure employed to drive the part which bends the hook in the lower or long leg portion of the spring;

Fig. 26 is a side elevational view of the structure shown in Fig. 25;

Fig. 27 is an enlarged sectional view on line 27—27 of Fig. 25;

Fig. 28 is a sectional view on line 28—28 of Fig. 27;

Fig. 29 is a sectional view taken on line 29—29 of Fig. 25;

Fig. 30 is an enlarged, somewhat diagrammatic view showing the spring and the various parts of the apparatus which cooperate to impart the desired shapes to the leg portions of the spring;

Fig. 31 is a somewhat diagrammatic view showing the spring and various parts of the apparatus which cooperate to cut off the end of the upper or short leg portion of the spring and to impart the desired angulation to the lower or long leg portion of the spring;

Fig. 32 is a transverse sectional view through a chute which guides the spring from the forming stage shown in Fig. 30 to the forming stage shown in Fig. 31;

Fig. 33 is a longitudinal sectional view through the chute shown in Fig. 32, both views showing a stop and release arrangement for controlling the passage of a spring through the chute, and Fig. 34 is an elevational view of the parts shown in Fig. 31 wtih the addition of a plunger device for freeing the spring and kicking it out to a storage bin or the like.

Referring now to the drawings, Figs. 1, 2 and 3 are general views which show the over-all organization of the apparatus. A substantial portion of the apparatus shown in Figs. 1-3 is a conventional torsion coiler which is unnecessary to describe in detail as it is well known in the art. Only so much of the torsion coiler will be referred to as is necessary to set forth its cooperative relation with the other portions of the apparatus.

Before describing the apparatus in detail, reference first is made to Figs. 30–34 which in Figs. 31 and 34 illustrate a finished spring 40 of the type fabricated by this apparatus. Referring to Fig. 31, spring 40 has a body 41 of spring convolutions and end or leg portions 42 and 43. Leg portion 42, the short and upper leg portion, has a hook 44 formed at its free end. Leg portion 43, the long and lower leg portion, has an offset 45 intermediate its ends and a hook 46 near its free end. Short leg portion 42 extends generally at right angles to the spring axis whereas long leg portion 43 is generally parallel to the spring axis.

Apparatus embodying the invention, as previously mentioned, provides for various adjustments so that springs formed thereby may have reasonable variation in diameter, length and shapes and sizes of the end or leg portions. The spring illustrated in the drawings and described above is merely exemplary, although as a practical matter it is a spring which is used extensively.

Referring again to Figs. 1–3, the apparatus is built around a bed 50 which is supported on legs 51. The power element of the apparatus is a crank wheel 52 (top right in Fig. 2) driven from any suitable source (not shown). Crank wheel 52 carries a connecting rod 53 which is adjustable on track 54 so that the crank arm may be adjusted for responsive characteristics desired in the formed spring.

Stage I of the apparatus, essentially a conventional torsion coiler, includes a spring forming mandrel 55 (center of Figs. 1 and 2 and upper right in Fig. 3). Mandrel 55 is carried by a rotatable chuck 56 which is mounted for up and down movement. Vertical movement of chuck 56 is derived from crank wheel 52 through a reciprocating carriage 57 (Fig. 1) and an adjustable, inclined guide 58.

A spring body 41 is formed on mandrel 55 from spring stock 60 (center of Fig. 3) which is fed to the apparatus from a source (not shown). Leading end 61 (Figs. 4–7) of spring stock 60 is fed by suitable feed mechanism (not shown) to mandrel 55 adjacent chuck 56 where it passes between mandrel 55 and a fixed pin 62 carried at the lower end of chuck 56 in spaced relation with mandrel 55.

After leading end 61 is located properly, chuck 56 and mandrel 55 rotate in the direction indicated by the arrow in Fig. 5 to coil a spring body 41 on mandrel 55. As previously mentioned the mandrel and chuck move upwardly as they rotate so that spring stock 60 may be fed on a fixed path. The leading end 61 of the spring stock, hereinafter called the short or upper leg portion 42 of the spring, is given a bend 63 (Fig. 7) by virtue of its relation between mandrel 55 and fixed pin 62 and the rotary movement of the chuck and mandrel. Thus, short leg portion 42 extends generally at right angles to the axis of spring body 41 as shown in Fig. 7.

Referring to Fig. 8, chuck 56 carries a spring biased pin 64 which retracts when a spring is being coiled but which extends when a formed spring relaxes after being cut from the stock to assist in ejecting the spring from fixed position on the mandrel. A timed blast of air through tube 65 (Figs. 1–3) assists in dislodging a spring from mandrel 55 to permit the spring to drop down along the mandrel to stage II of the apparatus.

An L-shaped element 66 (Figs. 4, 6 and 7) cooperates to insure that the aforesaid bend 63 is given the desired angulation.

A suitably driven timed cutter element, shown in part at 68 in Fig. 3, functions when spring body 41 has predetermined length and mandrel 55 ceases movement in order to sever the partially formed spring from spring stock 60. This element and its drive mechanism is a part of the conventional torsion coiler and hence needs no further description. Sufficient to say that it cuts at the desired point so that long leg portion 43 of the spring does not require further cutting to provide predetermined length.

The portion of the apparatus described above forms a spring in one cycle of apparatus operation to the partially completed state illustrated by the spring shown in Figs. 4 and 7. The spring has predetermined diameter as governed by the diameter of mandrel 55 and predetermined length as governed by the vertical movement and rotation of the chuck and mandrel, as well as the size of stock used. Upper and short leg portion 42 has an approximate length and it has a bend 63 so it extends at right angles to the spring body or an axial plane of the spring. Lower and long leg portion is cut to precise length and it extends at right angles to an axial plane of the spring.

As previously mentioned, the partially finished spring, when cut, relaxes so spring bias pin 54 and the air blast from tube 65 may dislodge the spring and cause it to drop under gravity along the length of mandrel 55. Thus, the extended length of mandrel 55 constitutes a guide and transporting means whereby a partially finished spring travels from stage I to stage II of the apparatus.

Stage II of the apparatus is located immediately below mandrel 55, and the essential components thereof are shown in Figs. 9-17 and Figs. 25-30. The stage II portion of the apparatus makes one complete cycle for each cycle of apparatus operation. It bends hook 44 in the short, upper leg portion 42 of spring 40. It also forms offset 45 in lower, long leg portion 43 and bends hook 46 in that end portion, as will be seen.

Referring first to Fig. 30, this figure is more or less diagrammatic and it shows a spring 40 and certain parts of the stage II apparatus which cooperate to impart the desired shapes to the leg portions of the spring.

When a spring 40 is released from mandrel 55 as mentioned above, it slides down the mandrel (not shown) to the terminal position shown in Fig. 30. Lower, long leg portion 43 rests on an edge 70 of a first positioning plate 71. The axial orientation of spring 40 is more or less random following its descent to the stage II portion of the apparatus.

A female die element 73 (Figs. 9, 11 and 13), presently to be described, travels into engagement with upper, short leg portion 42 of the spring and rotates the spring on its axis until leg portion 42 engages the face of a male die element 74. This face of male die element 74 is best shown in Fig. 30.

Male die element 74 is rotatable, as will be seen, and it has a protruding, axial mandrel 75 which, when the die elements 73 and 74 are engaged, enters cylindrical recess 76 (Fig. 9) in die element 73. Male die element 74 has a pilot roller 77 in spaced relation with mandrel 75, and short leg portion 42 is positioned by female die element 73 between mandrel 75 and pilot roller 77. After spring 40 is properly positioned, male die element 74 rotates through a partial revolution to bend hook 44 in short leg portion 42, as shown in Fig. 30. After the aforesaid forming operation, male die element 74 has a dwell period.

More or less simultaneously with the forming operation on short leg portion 42, a plunger tool 80 (also shown in Fig. 30) is effective to form offset 45 in lower, long leg portion 43. Plunger tool 80 (also shown in Figs. 13-15 and 17) has a suitably tapered face 81 for forming the desired offset. Plunger tool 80 enters female die element 82 and after forming offset 45 holds or clamps long leg portion 43 against the face of an adjacent rotatable die element 85.

Rotatable die element 85 has an axial mandrel 86 and a spaced pilot roller 87 (best shown in Fig. 30). The end of long leg portion 43 is positioned between mandrel 86 and pilot roller 87, and at a time before plunger tool 80 withdraws, die element 85 is rotated through a partial revolution to form hook 46 at the end of long leg portion 43. The terminal position of die element 85 is shown in Fig. 30, as well as hook 46 formed by the operation.

The aforesaid female die element 82 carries the previously mentioned plate 71 which supports long leg portion 43 of the spring as the latter is received in the stage II apparatus. Female die element 82 is adjacent a bearing block 90 which carries rotatable die element 85, as best shown in Figs. 13 and 30. The front face of bearing block 90 has a protruding positioning plate 91, the upper edge of which receives leg portion 43 after offset 45 has been formed therein. Plate 91 aids in positioning leg portion 43 between mandrel 86 and pilot roller 87 of die element 85.

The side of bearing block 90 opposite female die element 82 carries an upstanding plate 92 which also cooperates in positioning leg portion 43 and thus the entire spring. Upstanding plate 92, best shown in Fig. 16, has a throat-like recess 93 which guides leg portion 43 as the spring drops to stage II from mandrel 55 of stage I.

Having briefly referred to certain forming elements of the stage II portion of the apparatus and set forth the functions of the elements, other and subsidiary elements of the stage II apparatus now will be described.

Power for operating certain die elements of stage II is derived from a rotatable shaft 95 which is driven in synchronism with crank wheel 52. Shaft 95 is shown in relation to the entire apparatus in Figs. 1-3.

Female die element 73 (Figs. 9, 10, 11 and 13), it will be remembered, moves into engagement with upper, short leg portion 42 of the partially formed spring and rotates the latter axially to position leg portion 42 between mandrel 75 and pilot roller 77 of male die element 74. As shown in Figs. 9, 10, 11 and 13, female die element 73 is slidingly carried on a reciprocating plate 97 carried at one end of a slide element 98 which reciprocates in a fixed guide block 99. The other end of slide element 98 carries a cam roller 100.

Rotatable shaft 95 has a pull cam 102 which cooperates with cam roller 100 and imparts reciprocating movement to slide element 98 and associated reciprocating plate 97. A suitable bias means (not shown) serves to exert a force in opposition to that imparted by pull cam 102.

A fixed guide plate 104 secured to fixed guide block 99 has a diagonally extending recess 105. A slider 106 travels back and forth in recess 105 and is connected to a link 107 which is guided in reciprocating plate 97. Female die element 73 is mounted on link 107.

As plate 97 reciprocates in response to pull cam 102, slider 106 travels along recess 105 and imparts diagonal movement to female die element 73. Referring to Figs. 9 and 13, female die element 73 is shown in a remote position with respect to cooperating male die element 74. As pull cam 102 moves slide element 98 to the left, female die element 73 moves to the left and in the inclined direction determined by recess 105 to effect engagement between female and male die elements 73 and 74. Before the die elements engage, female die element 73 strikes short, upper leg portion 42 of the spring and rotates the spring on its axis so that leg portion 42 is properly positioned between mandrel 75 and pilot rollers 77 of male die element 74. Fig. 11 illustrates female and male die elements 73 and 74 in closed position.

Male die element 74 is journalled for rotation in a fixed bearing block 110 (Figs. 9-12) which is mounted on fixed guide block 99. Male die element 74 is rotated back and forth through a partial revolution by a coaxial sleeve 111, best shown in Fig. 12. Inward end 112 of male die element 74 telescopes sleeve 11 and is keyed thereto by a pin 113. A suitable bearing assembly 114 insures that male die element 74 rotates properly within fixed bearing block 110.

Still referring particularly to Fig. 12, coaxial sleeve 111 carries a stud 115 which engages a helical slot 116 formed in the cylindrical interior of a pair of bearing blocks 117 and 118. Coaxial sleeve 111 is journaled in the cylindrical interior of bearing blocks 117 and 118. As here shown, helical slot 116 is formed in a cylindrical sleeve element 119 which in turn is clamped between bearing blocks 117 and 118, although the slot could be formed in the bearing blocks themselves, if desired. The illustrated slotted sleeve element 119, however, makes it possible to utilize different sleeve elements for springs of different characteristics, thereby imparting greater flexibility to the apparatus.

Bearing blocks 117 and 118 carry a cam roller 120 (Figs. 9–11) which cooperates with a cam 121 carried on rotatable shaft 95. As the shaft rotates, cam 121 moves bearing blocks 117 and 118 to the right, thereby imparting rotary movement to coaxial sleeve 111 by reason of stud 115 and helical slot 116. Suitable force in opposition to cam 121 is provided by compression springs 122 which extend between fixed bearing block 110 and the bearing blocks 117 and 118. Two springs 122 each encircling sleeve 111 are shown in the drawings, but the two springs function as one.

In each rotary cycle of shaft 95 bearing blocks 117 and 118 are moved to the right to impart rotary movement to male die element 94, and, following the previously mentioned dwell period, the bearing blocks are spring driven to the left to restore the orientation of male die element 74 to starting position.

Referring to Figs. 13 and 15, shaft 95 has an offsetter cam 125 which engages a cam roller 126 carried by a slide block 127. Block 127 is mounted in a suitable guide (not shown) for back and forth movement in response to cam 125. Suitable means (not shown) apply a return force in opposition to the force delivered by cam 125.

Previously mentioned tapered plunger tool 80, which forms offset 45 in lower, long leg portion 43 of the spring, is secured by means 128 to slide block 127. As shown in Fig. 17, plunger tool 80 has an elongated slot 129 which permits longitudinal adjustment of plunger tool 80 with respect to block 127. Appropriate adjustment provides for more or less offset, depending on the characteristic in this respect desired in a particular spring.

Referring again to rotatable die element 85, which bends hook 46 in lower, long leg portion 43 of the spring, Figs. 13, 14, 15, 16 and 25–29 show a form of drive apparatus for imparting back and forth rotary motion to die element 85. Referring particularly to Figs. 25–29, a rotatable shaft 130 is suitably driven from a power element in the apparatus. Shaft 130 is driven in timed relation with crank wheel 52 and shaft 95. Rotatable shaft 130 carries a cam 131 which engages a cam roller 132 carried by a slider 133.

Slider 133 reciprocates in response to cam action in a fixed guide block 135 which has a transverse shaft 136. A small gear wheel 137 and a large gear wheel 138 are keyed to shaft 136, and small gear wheel 137 is driven by a rack 139 carried on slider 133. Large gear wheel 138 rotates and drives a sliding rack 140 which extends forwardly of guide block 135 as best shown in Figs. 25 and 26.

The above described slider, guide block, gear wheels and racks assembly constitutes a speed reduction means wherein sliding rack 140 travels at a slower speed than rack 139. In the example shown, the reduction is 2:1.

The free end of sliding rack 140 carries a threaded stud 142 which is threaded into a block 143. The latter is adjustable on stud 142 in order to control the amount of hook bending performed by rotatable die element 85.

Block 143 is associated with a plate 144 which is slidable along a fixed guide 145. An elongated rack 146 is mounted on plate 144, and the plate and rack thus move in response to the action of cam 131.

A return spring 148 extends between fixed guide 145 and elongated rack 146 to exert a force in opposition to that of cam 131.

Rack 146 engages and drives a gear wheel 150 (Figs. 13, 14, 15, 16, 25 and 26) carried on a shaft 151 which drives rotatable die element 85, the die element best shown in Fig. 30, which forms hook 46 in lower, long leg portion 43 of the spring.

The various cams 102, 121, 125 and 131 are shaped and timed so that the elements driven thereby function in proper relation to effect the desired spring forming operations. Within one cycle of apparatus operation the various cams activate their respective elements and permit the return of the elements to starting position for the next cycle.

The foregoing completes description of the forming operations and elements present in stage II of the apparatus.

At the conclusion of stage II operation, the partially formed spring 41 is released from the various stage II die elements, and it drops into a transfer chute 155 (Figs. 32 and 33). Chute 155 constitutes a means transporting spring 41 from stage II to stage III.

A suitable timing device is provided in connection with transfer chute 155 to insure that a spring 41 is delivered to stage III at the proper moment. In the form here shown, the timing device comprises a stop member 156 having a threaded end 157 which alternatively enters into and withdraws from the space within chute 155. Threaded end 157 is rotated through a partial revolution, as will be seen, and the thread pitch on member 156 and in an aperture in the wall of chute 155 is such that end 157 enters the space within chute 155 sufficiently far to stop the descent of a spring 41. Rotation of end 157 in direction to withdraw the end from the space within chute 155 is effective to withdraw the end so that spring 41 is released and permitted to drop to stage III of the apparatus.

Stop member 156 is rotated back and forth through the required partial revolution by means of a link 158 which, referring to Fig. 33, is reciprocated up and down by suitable means (not shown). Movement of link 158 is in timed relation with the forming elements of stage III.

A partially formed spring 41, when released in transfer chute 155, drops into a female die assembly 160 (Figs. 20, 21 and 31). Assembly 160 also is shown in the lower central part of Fig. 1.

Female die assembly 160 has substantially vertical effective face as shown in Figs. 21 and 31. Referring to Fig. 21, central portion 161 has an arcuate recess provided with grooves 162 which receive peripheral segments of adjacent spring convolutions. This central portion 161, sometimes called a female nest, cooperates with a clamp element, presently to be described, on a male die assembly to hold the partially formed spring 41 in a secure manner for the forming operations performed in stage III.

Just below central portion 61 is an arcuate aperture 165 in the effective face of female die assembly 160. Arcuate aperture 165 cooperates with a male die element in connection with bending the long, lower leg portion 43 of the spring, as will be seen.

The effective face of female die assembly 160 also has an elongated aperture 166, one edge of which constitutes a cutting element for trimming the short, upper leg portion 42 of the spring to predetermined length, as will be seen. One side of die assembly 160 carries a bracket 167 for mounting an ejector mechanism, later to be described, which cooperates to dislodge a finished spring 41 from the die assembly.

Cooperating with female die assembly 160 is a male die assembly 170, the latter being shown in Figs. 18 and 19. Various details of die assembly 170 are shown in Figs. 22–24.

Male die assembly 170 is carried on the forward end of a plunger 171 which is mounted for back and forth movement in suitable guides (not shown). Plunger 171 is driven back and forth by power derived from crank wheel 52 (Fig. 1). Connecting rod 53 of crank wheel 52 drives a block 172 (Figs. 2 and 2a) back and forth, as will be understood. The forward end of block 172 has a taper 173, and this tapered end enters an aperture in the upper end of a rocking member 174. The central portion of rocking member 174 is pivoted on a stud 175 (Figs. 2 and 2a).

The lower end of rocking member 174 carries a bracket 177 which is pivotally connected to the rear end of plunger 171, as shown in Figs. 1, 2, 18 and 19. A return spring 178 (Figs. 1 and 2) extends between the upper end of rocking member 174 and some fixed part of the apparatus. The tension provided by spring 178 maintains rocking member 174 in contact with the tapered end 173 of block 172. Thus, as block 172 travels back and forth, member 174 rocks on stud 175 and moves plunger 171 back and forth in timed relation with the various forming members of the apparatus.

Referring again to Figs. 18 and 19, male die assembly 170 includes a clamp element 180 which may have a concave face at its forward end. Clamp element 180 is carried by and has a resilient relation with a fixed block 181 mounted at the forward end of plunger 171. Block 181 has a hollow interior 182 (Fig. 22) within which is received and supported a portion of clamp element 180. Hollow interior 182 has a longitudinal groove 183 into which extends a pin 184 carried by clamp element 180. With this arrangement clamp element 180 is movable back and forth within block 181.

Block 181 has a hollow extension 185 (Fig. 22) provided with a pin 186 extending across the interior near the free end. A compression spring 187 extends between pin 186 and a shoulder 188 on clamp element 180. Spring 187 applies a strong bias on clamp element 180 and holds clamp element 180 in the extended position shown in Fig. 22 with pin 184 at the forward end of groove 183 of block 181.

When plunger 171 moves to the left, looking at Figs. 18 and 19, clamp element 180 is brought into engagement with a spring 41 which is seated in female die assembly 160. Clamp element 180 engages spring 41 on the side of the spring directly opposite central portion 161 of the female die assembly. As plunger 171 continues to the left, spring 187 is compressed to increase the clamping pressure applied by element 180. Spring 41 thus is held firmly between the female and male die assemblies.

Block 181 has fixed thereto a bender cam element 190 which is in alignment with arcuate aperture 165 in female die assembly 160. Bender cam element 190 has an arcuate cross section to correspond with the shape of aperture 165, and the forward end is tapered as shown at 191 in Fig. 22. The tapered and arcuate shape of the forward end of cam element 190 provides a forward edge on element 190 which corresponds generally to a spiral segment.

When plunger 171 moves to the left, referring to Figs. 18 and 19, the forward end of bender cam element 190 enters arcuate slot 165. The relationship between element 190 and slot 165 is best shown in Fig. 31. The tapered end 191 engages the then horizontally extending long, lower leg portion 43 of spring 41 (the then shape of the spring is illustrated in Fig. 30), and as cam element 190 continues its movement in bending direction, long lower leg portion 43 is bent to a direction which generally parallels the axis of the spring. The final bent direction of leg portion 43 is shown in Fig. 31.

A boss 193 on the effective face of female die assembly 160 provides a bending point which is engaged by leg portion 43. Cam element 190 bends the leg portion about this bending point.

It will be noted in Fig. 31 that clamp element 180, there shown in cross section, engages spring 41 immediately above boss 193 and the part of leg portion 43 which is engaged by cam element 190. Clamp element 180 thus insures that spring 41 is held securely throughout the bending operation on leg portion 43. Bender cam element 190 may be adjusted longitudinally so that the amount of bending in this operation may be predetermined with accuracy. Further adjustment in this regard may be made by interchanging end portions of block 172 which have the taper 173 (Figs. 2 and 2a) to vary the stroke of plunger 171.

Block 181 on plunger 171 also carries a cutter assembly 195 which trims the end of short upper leg portion 42 to predetermined length. Cutter assembly 195 may be mounted on block 181 as shown in Figs. 23 and 24.

Referring to Figs. 23 and 24, cutter assembly 195 includes a cutter element 196 carried by a hollow elongated member 197 which telescopes block 181. The interior of block 180 has a longitudinal slot 198 which receives an external boss 199 on elongated member 197. The boss-slot relationship permits limited back and forth movement of member 197 in block 181. A compression spring 200 extending between elongated member 197 and block 181 biases the former to extended position with respect to the latter.

Referring to Fig. 31, cutter element 196 is in longitudinal alignment with elongated aperture 166 in the effective face of female die assembly 160.

As plunger 171 travels to the left, cutter element 196 engages the excess length of short upper leg portion 42 of spring 41. This engagement aids in holding spring 41 firmly between the two die assemblies. As plunger 171 continues to move to the left, spring 200 is compressed and elongated member 197 is forced to recede within block 181. When boss 199 engages the rear of slot 198, cutter element 196 moves with block 181 and enters elongated aperture 166. This action, of course, trims the end of short upper leg portion 42 to proper length, thereby completing the shaping operations performed on spring 41.

At the conclusion of the stage III forming operations, tapered end 173 of block 172 is withdrawn from rocking member 174, and return spring 178 is effective to move rocking member 174 and plunger 171 in reverse direction and thereby separate the two die assemblies 160 and 170.

Any suitable means may be employed to eject the finished spring 41 and as here shown (Figs. 1, 2 and 34) a pneumatic device 202 delivers a blow to dislodge the spring. Pneumatic device 202 is mounted on the previously mentioned bracket 167 carried on female die assembly 160. A suitable hose 203 delivers compressed air to device 202.

A second hose 204 (Figs. 1 and 2) delivers properly timed blasts of compressed air to male die assembly 180, the air being directed toward spring 41 to assist in dislodging the spring at the completion of the stage III forming operations.

The ejected springs 41 drop to an inclined chute 206 (Figs. 1 and 2) and slide into a bin 207 or other suitable conveying apparatus.

From the above description it is thought that the construction and advantages of our invention will be readily apparent to those skilled in the art. Various changes in detail may be made without departing from the spirit or losing the advantages of the invention.

Having thus described our invention, what we claim as new and desire to secure by Letters Patents is:

1. Spring forming apparatus comprising means coiling a spring of predetermined diameter and length with long and short leg portions extending generally at right angles to axial planes, means cutting said long leg portion to predetermined length, means guiding said spring through a drop exceeding the spring length, means at the lower end of said last means engaging said short leg portion and rotating said spring on its axis, a first coiler means serving to stop rotation of said spring and forming a hook on said short leg portion, plunger means acting substantially simultaneously with said coiler means and forming an offset intermediate the ends of said long leg portion, a second coiler means operable after said plunger means to form a hook on said long leg portion beyond the offset, chute means receiving said spring after operation of said first coiler means, said plunger means and said second coiler means, timer means retaining said spring in said chute means, vise means receiving said spring in clamped relation on release of said timer means, means at the bottom of said chute means bending said long leg portion at a predetermined angle with an axial plane and a means cutting said short leg portion to predetermined length.

2. Spring forming apparatus comprising means coiling a spring of predetermined diameter and length with long and short leg portions extending generally at right angles to axial planes, means cutting said long leg portion to predetermined length, means guiding said spring through a drop exceeding the spring length, means at the lower end of said last means engaging said short leg portion and rotating said spring on its axis, a first coiler means serving to stop rotation of said spring and forming a hook on said short leg portion, plunger means acting substantially simultaneously with said coiler means and forming an offset intermediate the ends of said long leg portion, a second coiler means operable after said plunger means to form a hook on said long leg portion beyond the offset, chute means receiving said spring after operation of said first coiler means, said plunger means and said second coiler means, means at the bottom of said chute means bending said long leg portion at a predetermined angle with an axial plane and a means cutting said short leg portion to predetermined length.

3. Spring forming apparatus including three simultaneously operating stages, said first stage comprising means coiling a spring of predetermined diameter and length with long and short leg portions extending generally at right angles to axial planes, said second stage comprising means engaging said short leg portion and rotating said spring on its axis, a first coiler means serving to stop rotation of said spring and forming a hook on said short leg portion, plunger means acting substantially simultaneously with said first coiler means and forming an offset intermediate the ends of said long leg portion and a second coiler means operable after said plunger means to form a hook on said long leg portion beyond the offset, said third stage comprising vise means receiving said spring in clamped relation, means bending said long leg portion at a predetermined angle with an axial plane and means cutting said short leg portion to predetermined length, and means transporting a spring from one stage to the next whereby said apparatus after the first two cycles of apparatus operation has three springs in course of production and completes one spring on each cycle of apparatus operation.

4. Spring forming apparatus including three simultaneously operating stages, said first stage comprising means coiling a spring of predetermined diameter and length with long and short leg portions extending generally at right angles to axial planes, said second stage comprising first coiler means forming a hook on said short leg portion, plunger means acting substantially simultaneously with said first coiler means and forming an offset intermediate the ends of said long leg portion and a second coiler means operable after said plunger means to form a hook on said long leg portion beyond the offset, said third stage comprising means bending said long leg portion at a predetermined angle with an axial plane and means cutting said short leg portion to predetermined length, and means transporting a spring from one stage to the next whereby said apparatus after the first two cycles of apparatus operation has three springs in course of production and completes one spring on each cycle of apparatus operation.

5. The combination of claim 4 wherein said first stage includes a coiling mandrel of substantial length and wherein said second stage is disposed immediately below said first stage, said coiling mandrel serving as said means transporting a spring from said first stage to said second stage.

6. The combination of claim 4 wherein said means transporting a spring from said second stage to said third stage comprises a chute having chute walls, said chute having a mechanical stop device holding and releasing a spring within the chute and means actuating said stop device in timed relation with apparatus operation.

7. The combination of claim 6 wherein said stop device comprises a rod threaded through a chute wall, said rod being rotatable back and forth through a partial revolution to block and release a spring in said chute.

8. Forming apparatus for a spring having laterally extending leg portions, said apparatus including cooperating male and female die and coiler means bending a hook in one leg portion, means actuating said male and female die and coiler means, die means bending an offset in the other leg portion, means actuating said last die means substantially simultaneously with said male and female die and coiler means, coiler means bending a hook in said other leg portion, and means actuating said last coiler means after the bending movement of said last die means.

9. Forming apparatus for a spring having laterally extending short and long leg portions, said apparatus including male means engaging said short leg portion and orienting said spring, means moving said male means against said short leg portion, female means cooperating with said male means with said short leg portion therebetween, means rotating said female means to form a hook in said short leg portion, plunger means forming an offset intermediate the ends of said long leg portion, means moving said plunger means substantially simultaneously with said female means, a coiler means forming a hook in said long leg portion beyond said offset, and means actuating said coiler means after the forming movement of said plunger means.

References Cited in the file of this patent

UNITED STATES PATENTS

| 2,085,570 | Blount | June 29, 1937 |
| 2,372,082 | Iden | Mar. 20, 1945 |
| 2,456,222 | Stull | Dec. 14, 1948 |

FOREIGN PATENTS

| 323,499 | France | Aug. 5, 1902 |